US011872718B2

(12) United States Patent
McCue et al.

(10) Patent No.: US 11,872,718 B2
(45) Date of Patent: Jan. 16, 2024

(54) POWERED HANDHELD CUTTING TOOL

(71) Applicant: MILWAUKEE ELECTRIC TOOL CORPORATION, Brookfield, WI (US)

(72) Inventors: Shane McCue, Greenfield, WI (US); Drake J. Schlosser, Hartford, WI (US); Charles M. Rowland, Oconomowoc, WI (US); Anthony J. Buxton, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/901,143

(22) Filed: Sep. 1, 2022

(65) Prior Publication Data

US 2022/0410425 A1 Dec. 29, 2022

Related U.S. Application Data

(63) Continuation of application No. 17/104,783, filed on Nov. 25, 2020, now Pat. No. 11,472,058.

(Continued)

(51) Int. Cl.

*B27B 17/00* (2006.01)
*B27B 17/02* (2006.01)

(Continued)

(52) U.S. Cl.

CPC .......... *B27B 17/0008* (2013.01); *B27B 17/02* (2013.01); *B27B 17/086* (2013.01); *B27B 17/12* (2013.01)

(58) Field of Classification Search

CPC ..... B27B 17/02; B27B 17/00; B27B 17/0008; B27B 17/12

See application file for complete search history.

(56) References Cited

U.S. PATENT DOCUMENTS

| | | |
|---|---|---|
| 3,039,502 A | 6/1962 | Spivey |
| 3,142,196 A | 7/1964 | Haskell et al. |

(Continued)

FOREIGN PATENT DOCUMENTS

| | | |
|---|---|---|
| CN | 201179671 Y | 1/2009 |
| CN | 105798993 A | 7/2016 |

(Continued)

OTHER PUBLICATIONS

The Home Depot, "Milwaukee M12 Fuel 12-Volt Lithium-Ion Brushless Cordless 6 in. Hatchet Pruning Saw Kit with 4.0 Ah Battery and Charger," < https://www.homedepot.com/p/Milwaukee-6-in-M12-FUEL-12-Volt-Lithium-Ion-Brushless-Cordless-HATCHET-Pruning-Saw-Kit-with-4-0-Ah-Battery-and-Charger-2527-21/313505705>; website publicly available as early as Oct. 21, 2020 (9 pages).

(Continued)

*Primary Examiner* — Jennifer S Matthews
(74) *Attorney, Agent, or Firm* — Michael Best & Friedrich LLP

(57) ABSTRACT

A handheld cutting tool includes a housing including a motor housing portion, a drive housing portion, and a handle portion extending from one of the motor housing portion or the drive housing portion. A motor is located in the motor housing portion. A driven gear is coupled to the motor for receiving torque therefrom. A first guard extends between the handle portion and one of the drive housing portion or the motor housing portion, and a second guard extends between the drive housing portion and one of the handle portion and the motor housing portion. A guide bar extends from the drive housing portion at an angle offset relative to the handle portion and the first and second guards. A chain is supported on the guide bar, and a battery pack is removably coupled to a bottom part of the handle portion.

17 Claims, 5 Drawing Sheets

Related U.S. Application Data

(60) Provisional application No. 62/940,020, filed on Nov. 25, 2019.

(51) Int. Cl.
*B27B 17/12* (2006.01)
*B27B 17/08* (2006.01)

(56) References Cited

U.S. PATENT DOCUMENTS

| | | | | |
|---|---|---|---|---|
| 4,365,416 | A | 12/1982 | Overbury | |
| 4,389,779 | A | 6/1983 | Overbury et al. | |
| 4,841,641 | A | 6/1989 | Laidlaw | |
| 4,979,306 | A | 12/1990 | Koga et al. | |
| 5,089,738 | A | 2/1992 | Bergqvist et al. | |
| 5,685,080 | A * | 11/1997 | Amano | B27B 17/08 30/DIG. 1 |
| D389,026 | S | 1/1998 | Amano et al. | |
| 5,896,669 | A | 4/1999 | Uhl | |
| D481,601 | S | 11/2003 | Ashfield | |
| 6,715,212 | B2 | 4/2004 | Durr et al. | |
| D536,590 | S | 2/2007 | Busschaert | |
| 7,273,159 | B2 | 9/2007 | Brotto | |
| 7,497,275 | B2 | 3/2009 | Brotto | |
| 8,286,359 | B2 | 10/2012 | Ashfield | |
| 8,833,221 | B2 | 9/2014 | Tomita et al. | |
| 8,904,651 | B2 | 12/2014 | Heinzelmann | |
| 9,636,840 | B2 | 5/2017 | Saitoh | |
| 9,713,880 | B2 | 7/2017 | Haneda et al. | |
| 9,744,684 | B2 | 8/2017 | Fuchs | |
| 2004/0098869 | A1 * | 5/2004 | Ashfield | B27B 17/0008 30/381 |
| 2004/0231170 | A1 * | 11/2004 | Neitzell | B23D 51/01 30/340 |
| 2007/0062361 | A1 * | 3/2007 | Xiong | B27B 17/14 83/814 |
| 2007/0240892 | A1 | 10/2007 | Brotto et al. | |
| 2011/0162219 | A1 | 7/2011 | Okouchi | |
| 2014/0106915 | A1 | 4/2014 | Kistler et al. | |
| 2015/0251258 | A1 | 9/2015 | Jiang et al. | |
| 2015/0273722 | A1 * | 10/2015 | Madson | B23D 57/023 30/373 |
| 2015/0375416 | A1 * | 12/2015 | Haneda | B27B 17/00 30/383 |
| 2017/0066155 | A1 * | 3/2017 | Ketonen | B27B 33/14 |
| 2017/0165863 | A1 * | 6/2017 | Wolf | B25F 5/02 |
| 2017/0239835 | A1 * | 8/2017 | Ebner | B27B 17/12 |
| 2017/0259359 | A1 * | 9/2017 | Kachi | B23D 57/023 |
| 2018/0084731 | A1 | 3/2018 | Harris | |
| 2018/0133818 | A1 | 5/2018 | Mang et al. | |
| 2018/0186027 | A1 | 7/2018 | McRoberts et al. | |
| 2019/0111582 | A1 * | 4/2019 | Suzuki | B27B 17/08 |
| 2021/0101303 | A1 * | 4/2021 | Hess | B27B 17/0008 |

FOREIGN PATENT DOCUMENTS

| | | | | |
|---|---|---|---|---|
| CN | 205572618 | U | 9/2016 | |
| CN | 206475267 | U | 9/2017 | |
| CN | 107379128 | A | 11/2017 | |
| CN | 207058787 | U | 3/2018 | |
| CN | 207669439 | U | 7/2018 | |
| CN | 105519403 | B | 10/2018 | |
| CN | 110170702 | A | 8/2019 | |
| DE | 202006019557 | U1 | 3/2007 | |
| DE | 102012206820 | A1 | 10/2013 | |
| DE | 102012215450 | A1 | 3/2014 | |
| DE | 102012215457 | A1 | 3/2014 | |
| DE | 102013203630 | A1 | 9/2014 | |
| DE | 102013212637 | A1 | 12/2014 | |
| DE | 202016102503 | U1 | 8/2016 | |
| DE | 202016102503 | U1 * | 9/2016 | A01G 3/053 |
| DE | 102016008496 | A1 | 1/2018 | |
| EP | 2017045 | A2 | 1/2009 | |
| EP | 2433766 | A1 | 3/2012 | |
| EP | 3135447 | A1 | 3/2017 | |
| EP | 3536462 | A1 * | 9/2019 | B23D 29/02 |
| JP | 2016203491 | A | 12/2016 | |
| WO | 8200434 | A1 | 2/1982 | |
| WO | 2007025503 | A1 | 3/2007 | |
| WO | WO-2012039488 | A1 * | 3/2012 | B27B 17/08 |
| WO | 2012116840 | A1 | 9/2012 | |
| WO | 2013159967 | A1 | 10/2013 | |
| WO | 2017100478 | A1 | 6/2017 | |

OTHER PUBLICATIONS

International Search Report and Written Opinion for Application No. PCT/US2020/062273 dated Mar. 18, 2021 (12 pages).

Extended European Search Report for Application No. 20893555.1 dated Nov. 20, 2023 (11 pages).

* cited by examiner

POWERED HANDHELD CUTTING TOOL

CROSS-REFERENCE TO RELATED APPLICATIONS

This application is a continuation of U.S. patent application Ser. No. 17/104,783, filed Nov. 25, 2020, which claims priority to U.S. Provisional Patent Application No. 62/940,020, filed Nov. 25, 2019, the entire contents of all of which are incorporated by reference herein.

FIELD

The present disclosure relates to power tools, and more particularly to powered handheld cutting tools.

BACKGROUND

Powered handheld cutting tools, such as chainsaws or pruners, include a saw chain driven around a chain guide for cutting objects, such as trees and tree branches. Some powered handheld chainsaws or pruners include an electric motor for driving the chain link blade and a battery for powering the electric motor.

Saw chains are typically formed with linkages riveted to one another through a common drive link. Each drive link is engaged by a driven sprocket to drive the saw chain around the chain guide. Saw chains for chain guides with lengths up to 610 mm (approximately 24 inches) may be referred to as standard-type chains and may be identified by the number of drive links in the chain. For example, a saw chain for a 610 mm chain guide may have about 84 drive links.

Standard chains generally include cutting elements attached to every other linkage. The linkage between cutting elements is referred to as a tie strap or skip tooth. Different configurations of saw chains are often categorized based on their chain sequence of cutting elements and tie straps.

Some saw chains include cutting elements attached to each linkage. Saw chains with these types of saw chain sequences may be referred to as full house chains. A full house chain will have nearly twice as many cutting elements as a standard chain with the same number of drive links.

Other saw chains may include cutting elements attached to every other linkage and separated by at least one tie strap. These types of saw chains may be referred to as semi-skip chains or skip chains, depending on how many tie straps are included between cutting elements. Semi-skip and skip chains are typically used on chain guides from 610 mm to greater than 813 mm (approximately 32 inches).

SUMMARY

The disclosure provides, in one aspect, a handheld cutting tool including a motor, a driven gear coupled to the motor for receiving torque therefrom and a sprocket coupled for co-rotation with the driven gear and a housing. The housing includes a motor housing portion in which the motor is located, a drive housing portion in which the driven gear and sprocket are located, and a handle portion extending from one of the motor housing portion or the drive housing portion. The cutting tool further includes a handle guard extending between the handle portion and one of the drive housing portion or the motor housing portion, wherein an interior portion of the handle guard and the handle portion of the housing collectively define an opening through which a user's hand is positionable for grasping the handle portion, and wherein an exterior portion of the handle guard opposite the interior portion includes a support face that defines a plane relative to the housing. The cutting tool even further includes a guide bar extending from the drive housing portion and a chain supported on the guide bar and engaged with the sprocket such that rotation of the sprocket moves the chain along the guide bar. The support face of the handle guard is configured to support the cutting tool on a horizontal support surface. And, the chain does not intersect the plane.

The disclosure provides, in another aspect, a handheld cutting tool including a motor, a driven gear coupled to the motor for receiving torque therefrom and a sprocket coupled for co-rotation with the driven gear and a housing. The housing includes a motor housing portion in which the motor is located, a drive housing portion in which the driven gear and sprocket are located, and a handle portion extending from the motor housing portion. The cutting tool further includes a guide bar extending from the drive housing portion and a chain supported on the guide bar and engaged with the sprocket such that rotation of the sprocket moves the chain along the guide bar. The cutting tool even further includes a battery pack removably coupled to an end of the handle portion opposite the motor housing portion. The battery pack includes a foot portion defining a plane. A center of gravity of the cutting tool is located above the foot portion when the cutting tool is stood upright on the foot portion, thus permitting the cutting tool to balance only on the foot portion of the battery pack.

Other aspects and aspects of the disclosure will become apparent by consideration of the detailed description and accompanying drawings.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
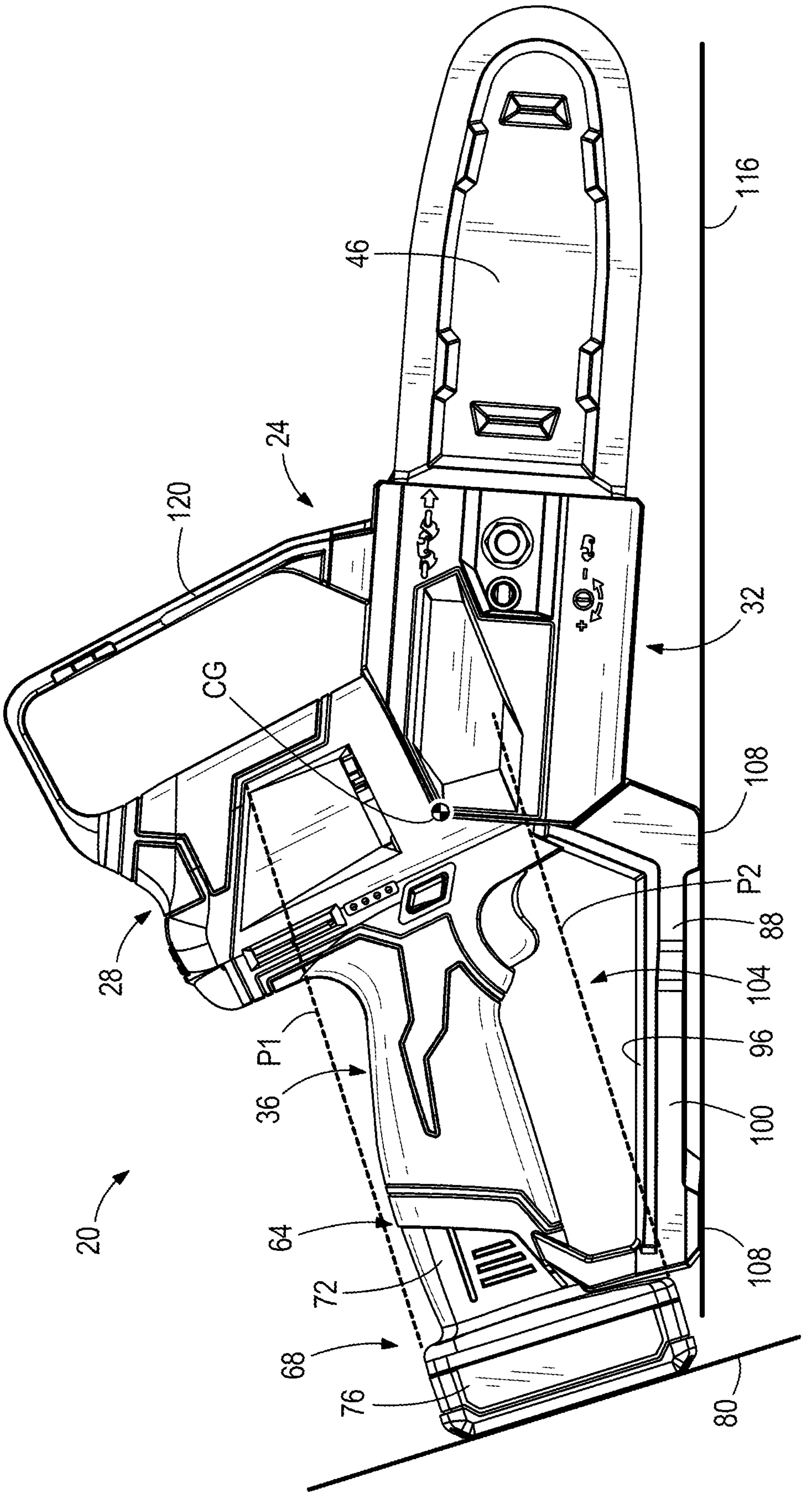
FIG. 1 is a side view of a powered handheld pruner in accordance with an embodiment of the invention, illustrating the pruner supported upon a surface in a horizontal orientation.
Figure 2:
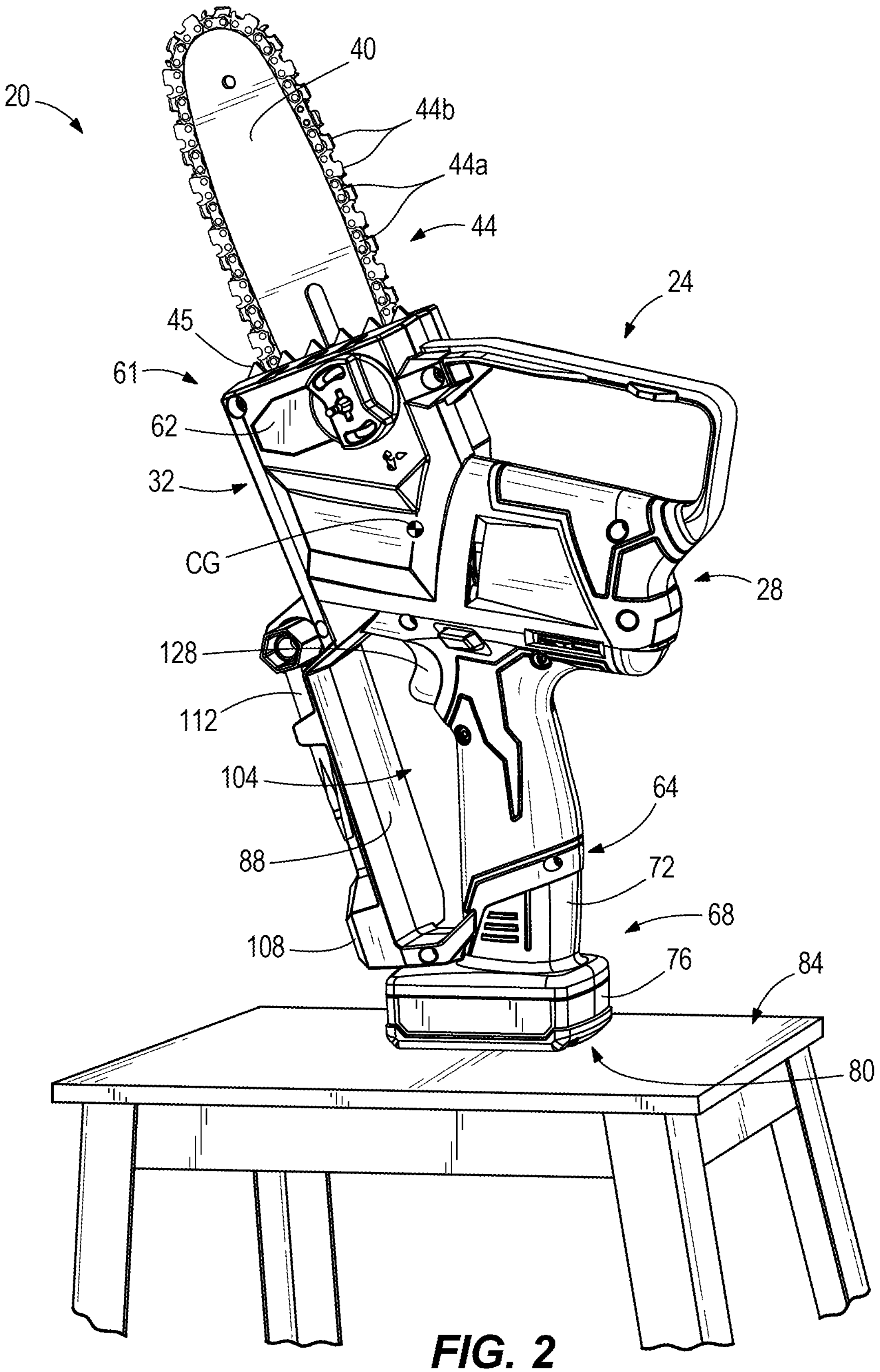
FIG. 2 is another side view of the powered handheld pruner of FIG. 1, illustrating the pruner supported upon a surface in a vertical or upright orientation, with a cover removed to show a cutter.
Figure 3:
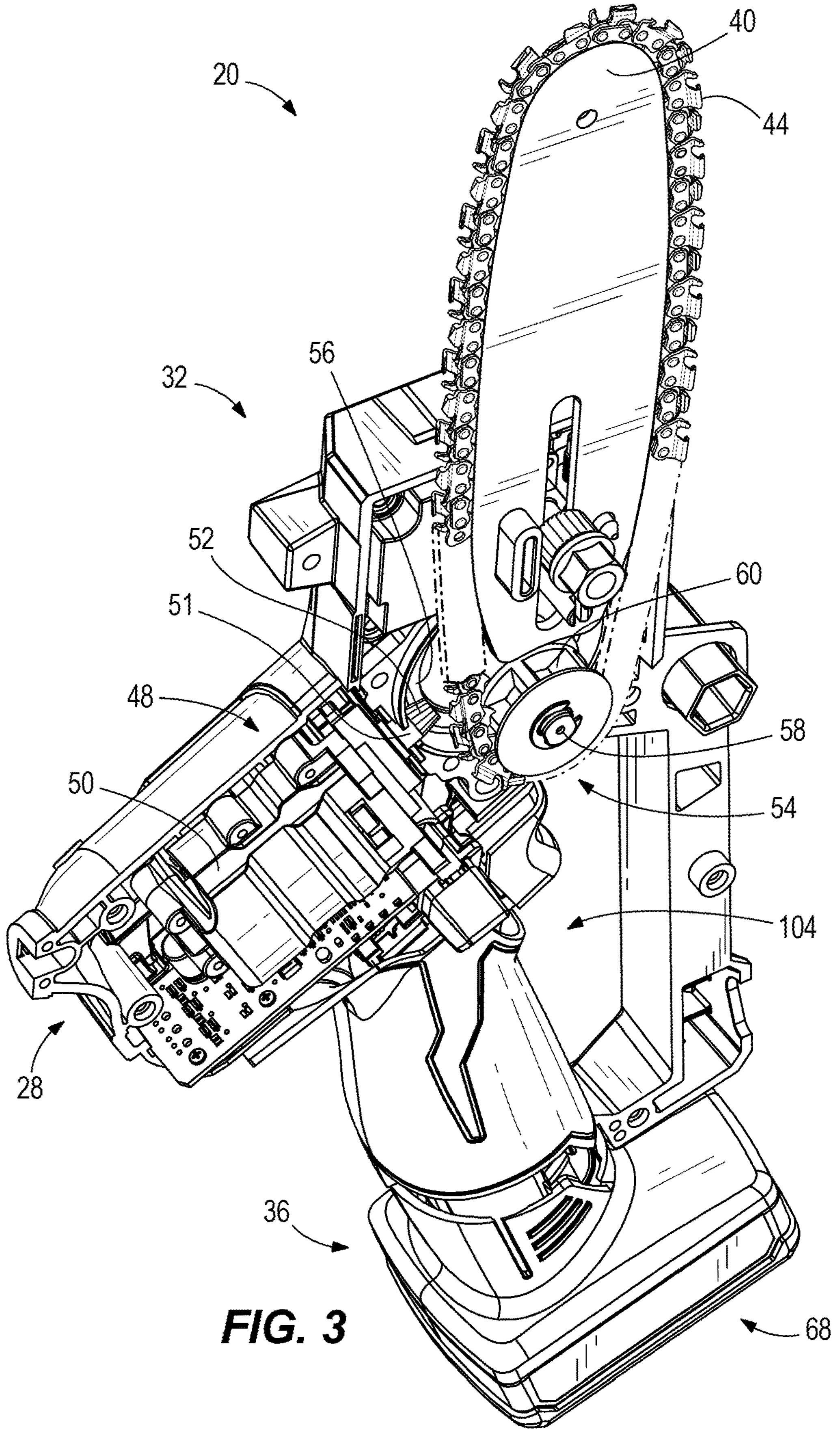
FIG. 3 is a perspective view of the powered handheld pruner of FIG. 1, with portions removed.

FIGS. 1-3 illustrate a powered handheld cutting tool, such as a pruner 20, in accordance with an embodiment of the invention. The pruner 20 includes a housing 24 defining a motor housing portion 28, a drive housing portion 32 and a handle housing portion 36. In the illustrated embodiment, the motor housing portion 28 and the drive housing portion 32 are oriented with respect to one another at an oblique angle. The handle housing portion 36 is transverse to the motor housing portion 28, such that the handle housing portion 36 and the driver housing portion 32 are oriented at an oblique angle to one another. In other embodiments, the handle housing portion 36 may extend from either the drive housing portion 32 or the motor housing portion 28.

Figure 5:
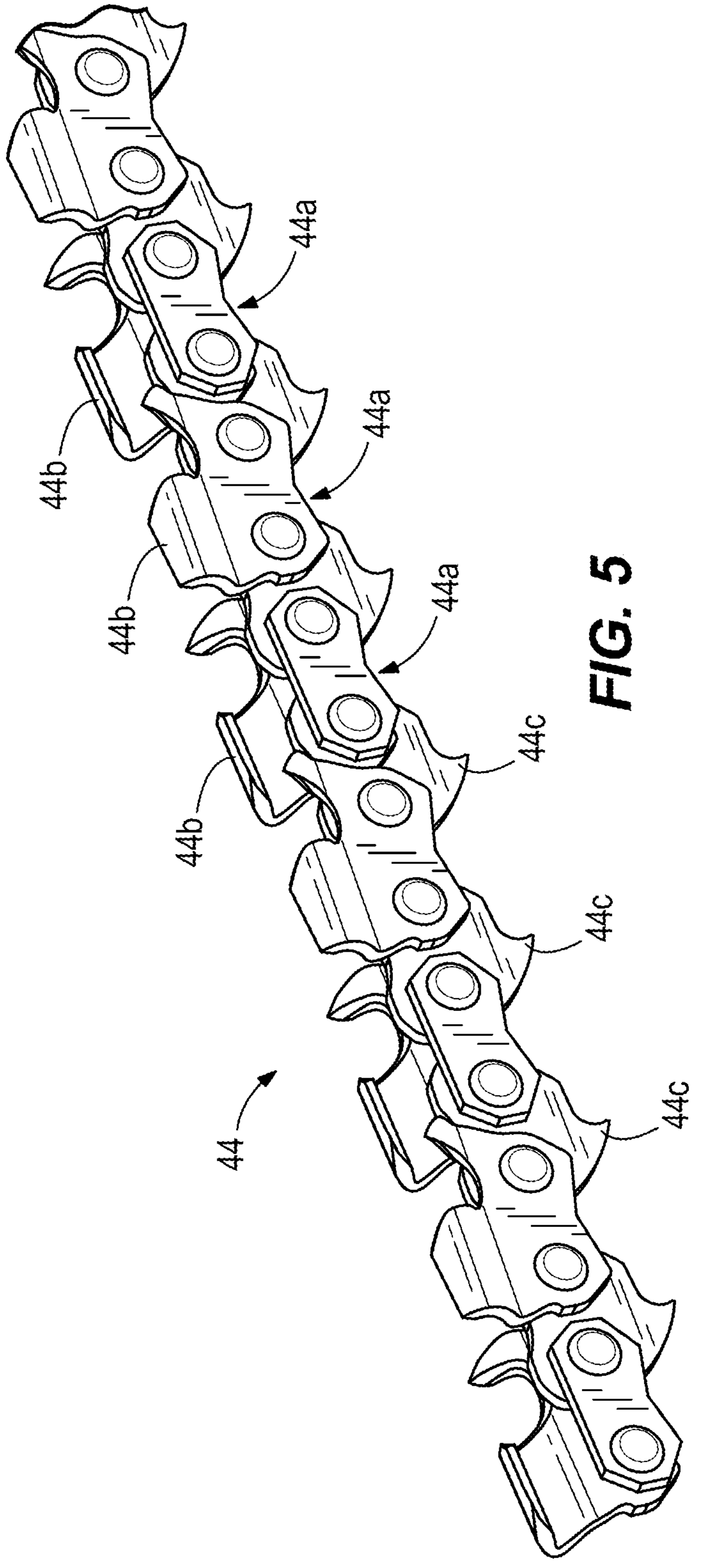
FIG. 5 illustrates an exemplary chain for the powered handheld pruner of FIG. 1.

As illustrated in FIG. 2, the pruner 20 also includes a guide bar 40 that extends from the drive housing portion 32. The guide bar 40 supports a saw chain 44 that may be driven about the guide bar 40. Referring to FIG. 5, the saw chain 44 includes a plurality of linkages 44*a* and a plurality of cutting elements 44*b* (i.e., saw teeth) that may have any desired configuration, such as full chisel, semi-chisel, chipper, or the like. Adjacent linkages 44*a* in the plurality of linkages 44*a* are rotatably attached to one another by a drive link 44*c*. In the illustrated embodiment, at least one of the cutting elements 44*b* is supported on each linkage 44*a*, adjacent a drive link 44*c*, such that the number of linkages 44*a*, the number cutting elements 44*b*, and the number of drive links 44*c* are approximately equal, and the saw chain 44 is a full house saw chain. In another embodiment by way of example, each linkage 44*a* supports one or more cutting element 44*b* such that the number of cutting elements 44*b* is greater than or approximately equal to the number of linkages 44*a* and the number of drive links 44*c*. In yet another embodiment by way of example, at least 90% of the linkages 44*a* support one or more cutting element 44*b*. In other embodiments by way of example, at least one linkage 44*a* supports a plurality of cutting elements 44*b*.

By providing additional cutting teeth, the exemplary full house saw chain 44 can improve cutting efficiency for the pruner 20 and reduce vibration generated during the cutting operation for smoother operation, especially at lower speeds, when compared to a standard-type saw chain, semi-skip saw chain, etc. In other embodiments by way of example, the saw chain 44 is any of a standard-type saw chain, a semi-skip saw chain, skip saw chain, or the like, such that use of the pruner 20 is not limited to a single saw chain sequence or configuration. The pruner 20 may also include a chain brake, dampener, or the like (not shown) for resisting movement of the saw chain 44 about the guide bar 40. In some embodiments by way of example, the full house saw chain 44 may be utilized and operated at the lower speeds to alleviate or eliminate the need of a chain brake or the like. In other embodiments by way of example, the pruner 20 may include a chain brake or the like and the exemplary full house saw chain 44 or another sequence/configuration of saw chain.

The guide bar 40 is movable within the drive housing portion 32 to adjust the tension of the saw chain 44. In some embodiment, the guide bar 40 may be between about 127 mm (approximately 5 inches) and about 305 mm (approximately 12 inches) long. A bumper spike 45 is coupled to and extends from the drive housing portion 55 to engage a workpiece and increase stability by providing a pivot point during a cutting operation. As shown in FIG. 1, a safety or storage cover 46 is selectively and slidably attachable over the guide bar 40 to shield the saw chain 44 during non-operation of the pruner 20. The cover 46 may be oblique, transparent, translucent, flexible, rigid, or a combination thereof. The cover 46 may also be completely removed from the guide bar 40.

Referring to FIG. 3, the pruner 20 includes a drive mechanism 48 positioned, collectively, within the motor housing portion 24 and the drive housing portion 32 for providing torque to the saw chain 44, causing it to rotate about the guide bar 40. The drive mechanism 48 includes an electric motor 50, which may be, for example, a brushed or brushless DC motor, supported within the motor housing portion 28. The motor 50 includes an output shaft 51 to which a driving gear 52 (e.g., a pinion gear) is coupled for co-rotation. The drive mechanism 48 also includes a gear train 54, positioned within the drive housing portion 32, between the driving gear 52 and the saw chain 44. The gear train 54 includes a driven gear 56 (e.g., a ring gear), an intermediate shaft 58 supporting the driven gear 56 to which the driven gear 56 is coupled for co-rotation, and a sprocket 60 coupled for co-rotation with the intermediate shaft 58. The saw chain 44 wraps around the sprocket 60 such that rotation of the sprocket 60 rotates the saw chain 44 about the guide bar 40. More particularly, the sprocket 60 meshes with the drive links 44*c* of the saw chain 44 to drive the cutting elements 44*b* about the guide bar 40.

The pruner 20 further includes a trigger 128, upon which a user's index finger is positioned, to selectively enable the drive mechanism 48. The trigger 128 is mechanically, electrically, or electro-mechanically connected to the motor 50 such that actuation of the trigger 128 by a user advances the saw chain 44 about the guide bar 40 in cutting operation.

As illustrated in FIG. 2, the pruner 20 further includes a lubrication system 61 for supplying lubrication (e.g., bar and chain oil) to the drive mechanism 48, the saw chain 44, and/or the guide bar 40. The lubrication system 61 includes a sealable transparent lubricant reservoir 62 such that a level of lubricant within the reservoir 62 may be viewed from outside of the lubricant reservoir 62.

In the illustrated embodiment of FIGS. 1 and 2, the handle housing portion 36 includes a battery receiving portion 64 disposed opposite the motor housing portion 28. The battery receiving portion 64 is configured to receive at least a portion of a rechargeable battery pack 68 that provides power to the motor 50. In the illustrated embodiment, the battery pack 68 includes a stem 72, a portion of which (not shown) is received in the battery receiving portion 64, and a foot 76 extending transversely from the stem 72.

The foot 76 defines a base plane 80 (FIG. 1) that is transverse to the handle housing portion 36. Due to the arrangement of the various portions 28, 32, 36 of the housing 24, the pruner 20 includes a center of gravity CG located above the foot 76 and proximate the intersection of the motor housing portion 28 and the drive housing portion 32. This location of the center of gravity CG permits the pruner 20 to balance only on the foot 76 if stood upright on a horizontal surface 84 (e.g., table, workbench, etc.). In other words, because the center of gravity CG of the pruner 20 is located within the surface area bounded by the foot 76 (partially represented by spaced planes P1, P2 in FIG. 1), the pruner 20 is able to be stood upright on a horizontal surface 84 without tipping over. Although not shown, the center of gravity CG of the pruner 20 is also located between spaced planes coinciding with the width (the dimension perpendicular to the page of FIG. 1) of the foot 76. It should be noted that, although the center of gravity CG is shown in generally the same place when the cover 46 is attached or removed, a weight of the cover 46 may change the center of gravity CG by a negligible or nominal amount.

Referring to FIGS. 1 and 2, the housing 24 further includes a handle guard 88 that extends between the handle housing portion 36 and the drive housing portion 32. The handle housing portion 36 includes a grip that is grasped by a user while operating the pruner 20. The handle guard 88 includes an interior portion 96 and an exterior portion 100 (FIG. 1). The interior portion 96 faces toward the handle housing portion 36 to define an opening 104 through which a user's hand may be positioned on the grip 92. The exterior portion 100 is arranged on the handle guard 88 opposite from the handle housing portion 36 and includes a support face 108. In the illustrated embodiment, the support face 108 defines a plane 116. The pruner 20 also includes a removable adjusting tool 112 (FIG. 2) supported on the handle guard 88 for adjusting the tension of the saw chain 44 on the guide bar 40.

Figure 4:
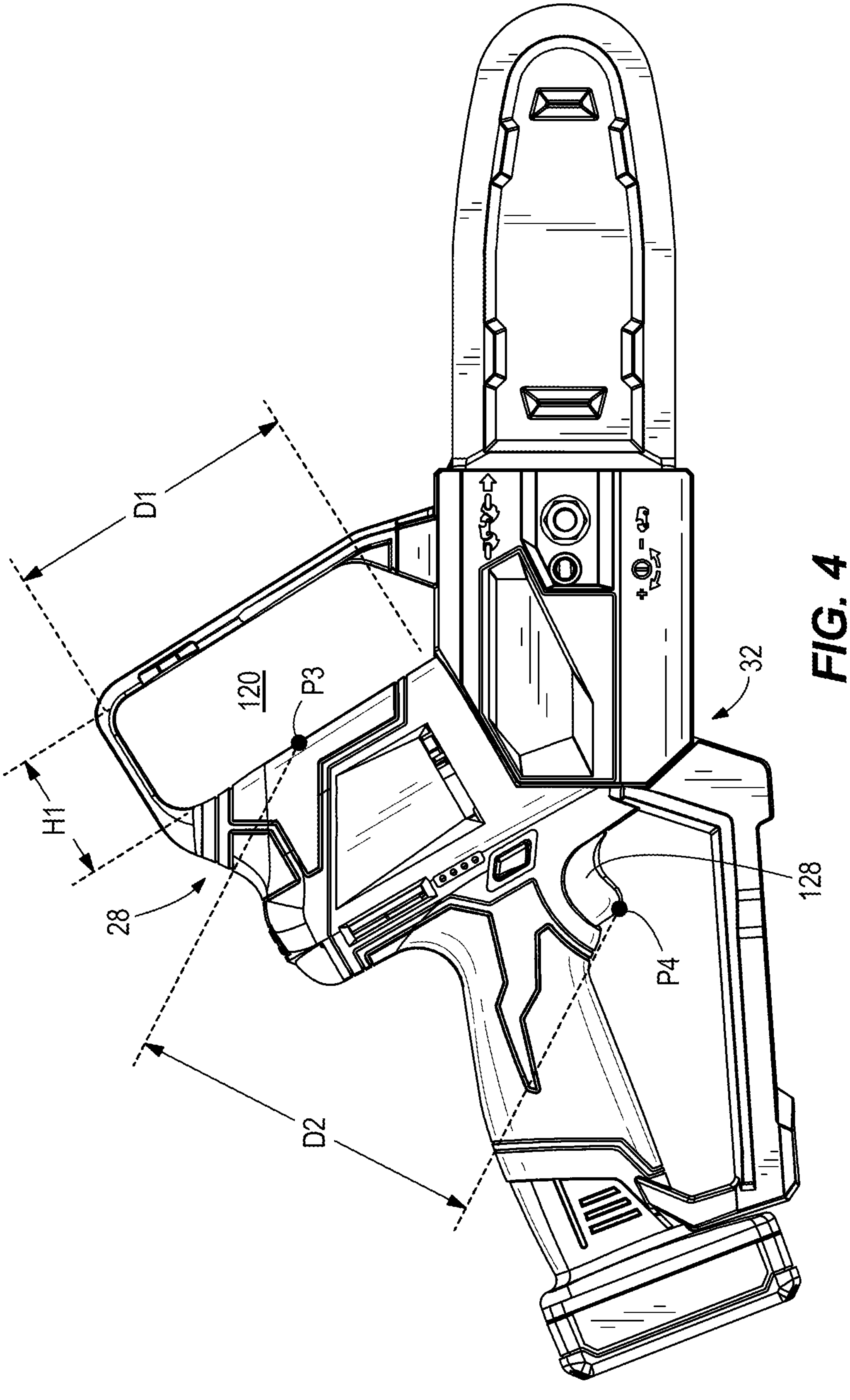
FIG. 4 is another side view of the powered handheld pruner of FIG. 1.

The housing 24 even further includes a knuckle guard 120 that extends between the drive housing portion 32 and the motor housing portion 28 (FIG. 1). The knuckle guard 120 prevents a user's hand from moving away from the pruner 20 while the user is grasping the motor housing portion 36. The knuckle guard 120 also provides protection for the user's hand if wrapped around the motor housing portion 28 while the pruner 20 is in use. FIG. 4 illustrates the dimensions of an opening 124 defined between the knuckle guard 120 and the motor housing portion 28.

With reference to FIG. 1, the pruner 20 is arranged such that the saw chain 44 does not intersect the plane 116 defined by the support face 108. Such an arrangement allows the user to rest the pruner 20 on a level (i.e., horizontal) support surface by means of the support face 108 without contacting the horizontal support surface with the saw chain 44. In addition, the plane 116 does not intersect the foot 76 of the battery pack 68. As such, the foot 76 of the battery pack 68 also would not contact the horizontal support surface upon which the pruner 20, and the handle guard 88 in particular, is placed. In the illustrated embodiment, the plane 116 is generally parallel with the guide bar 40 to prevent the saw chain 44 from intersecting the plane 116. In other embodiments, a small acute angle may be defined between the plane 116 and a longitudinal axis of the guide bar 40 as long as the saw chain 44 does not intersect the plane 116.

With reference to FIG. 4, the length of the opening 124 is defined by dimension D1, whereas the height of the opening is defined by dimension H1. In the illustrated embodiment, dimension D1 is at least about 100 mm and dimension H1 is about 35 mm or higher. A point P3 on the motor housing portion 28 is below the knuckle guard 120 and about half-way between the motor housing portion 28 and the drive housing portion 32. A lowermost point P4 on the trigger 128 is distanced from the point P3. Dimension D2 defines a distance between the point P3 and the lowermost point P4. In the illustrated embodiment, dimension D2 is about 125 mm or higher.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A handheld cutting tool comprising:
- a housing including a motor housing portion, a drive housing portion, and a handle portion extending from one of the motor housing portion or the drive housing portion;
- a motor located in the motor housing portion;
- a driven gear coupled to the motor for receiving torque therefrom and a sprocket coupled for co-rotation with the driven gear, the driven gear and the sprocket located in the drive housing portion;
- a first guard extending between the handle portion and one of the drive housing portion or the motor housing portion, wherein an interior portion of the first guard and the handle portion of the housing collectively define a first opening through which a user's hand is positionable for grasping the handle portion;
- a second guard extending between the drive housing portion and one of the handle portion and the motor housing portion, wherein an interior portion of the second guard and the drive housing portion collectively define a second opening for receiving a hand to grasp the drive housing portion;
- a guide bar extending from the drive housing portion at an angle offset relative to each of the handle portion, the first guard, and the second guard;
- a chain supported on the guide bar and engaged with the sprocket such that rotation of the sprocket moves the chain along the guide bar; and
- a battery pack removably coupled to an end of the handle portion opposite the motor housing portion,
- wherein the battery pack includes a foot portion that defines a base plane,
- wherein a center of gravity of the handheld cutting tool is located above the foot portion when the cutting tool is stood upright on the foot portion to permit the handheld cutting tool to balance relative the base plane on the battery pack.

2. The handheld cutting tool of claim 1, wherein an exterior portion of the first guard opposite the interior portion includes a support face that defines a plane relative to the housing, and wherein the support face of the first guard is configured to support the handheld cutting tool on a horizontal support surface.

3. The handheld cutting tool of claim 2, wherein the guide bar extends from the drive housing portion in a direction transverse to the plane, such that the chain does not intersect the plane.

4. The handheld cutting tool of claim 1, wherein the motor housing portion and the drive housing portion are oriented with respect to one another at an oblique angle, wherein the handle portion and the driver housing portion are oriented with respect to one another at an oblique angle, and wherein the handle portion is transverse to the motor housing portion.

5. The handheld cutting tool of claim 4, wherein the motor includes an output shaft configured to rotate the driven gear, the output shaft rotatable about an axis extending in a common plane with the guide bar.

6. The handheld cutting tool of claim 1 further comprising a lubrication system configured for supplying lubrication to at least one of the driven gear, sprocket, guide bar, and chain,
- wherein the lubrication system includes a transparent lubricant reservoir configured to indicate a level of lubricant within the reservoir from outside of the lubricant reservoir, and
- wherein the guide bar is movable within the drive housing portion to adjust the tension of the saw chain, a mechanism for adjusting the tension of the saw chain and the lubrication system being positioned on opposite sides of the guide bar.

7. The handheld cutting tool of claim 1, wherein the chain includes a plurality of linkages configured to support a plurality of cutting elements, wherein adjacent linkages in the plurality of linkages are rotatably attached by a drive link, and wherein a number of linkages in the plurality of linkages is approximately equal to a number of cutting elements in the plurality of cutting elements.

8. A handheld cutting tool comprising:
- a motor;

a driven gear coupled to the motor for receiving torque therefrom and a sprocket coupled for co-rotation with the driven gear;

a housing including a motor housing portion in which the motor is located, a drive housing portion in which the driven gear and sprocket are located, and a handle portion extending from the motor housing portion, the motor housing portion and the drive housing portion oriented with respect to one another at an oblique angle, the handle portion and the drive housing portion oriented with respect to one another at an oblique angle, and the handle portion oriented transverse to the motor housing portion;

a battery pack removably coupled to an end of the handle portion opposite the motor housing portion, the battery pack including a foot portion defining a base plane;

a guide bar extending from the drive housing portion and away from the handle portion in a direction angled relative to the base plane, the motor including an output shaft rotatable about an axis extending in a common plane with the guide bar; and a chain supported on the guide bar and engaged with the sprocket such that rotation of the sprocket moves the chain along the guide bar, wherein a center of gravity of the handheld cutting tool is located above the foot portion when the handheld cutting tool is stood upright on the foot portion.

9. The handheld cutting tool of claim 8 further comprising a handle guard extending between the handle portion and the motor housing portion, wherein an interior portion of the handle guard and the handle portion of the housing collectively define an opening for receiving a user's hand to grasp the handle portion, and wherein an exterior portion of the handle guard opposite the interior portion includes a support face that defines a plane relative to the housing.

10. The handheld cutting tool of claim 9, wherein the support face of the handle guard is configured to support the handheld cutting tool on a horizontal support surface, and wherein the chain does not intersect the plane defined by the support face.

11. The handheld cutting tool of claim 9, wherein the support face of the handle guard is configured to support the handheld cutting tool on a horizontal support surface, and wherein the battery pack does not interest the plane defined by the support face.

12. The handheld cutting tool of claim 8, wherein the center of gravity of the handheld cutting tool is further located proximate an intersection of the motor housing portion, the drive housing portion, and the handle portion.

13. A handheld cutting tool comprising:

a housing including a motor housing portion, a drive housing portion oriented with respect to the motor housing portion at an oblique angle, and a handle portion oriented with respect to the drive housing portion at an oblique angle and oriented transverse to the motor housing portion, the handle portion extending from one of the motor housing portion or the drive housing portion;

a motor located in the motor housing portion;

a driven gear coupled to the motor for receiving torque therefrom and a sprocket coupled for co-rotation with the driven gear, the driven gear and the sprocket located in the drive housing portion;

a battery pack removably coupled within an end of the handle portion, the battery pack including a foot portion defining a base plane bounded within a first plane and a second plane offset relative to one another, and by a third plane and a fourth plane offset relative to one another; and a center of gravity located above the foot portion and within the base plane, wherein the center of gravity permits balancing on the foot portion of the handheld cutting tool in an upright position to inhibit tipping of the handheld cutting tool towards the first plane, the second plane, the third plane, or the fourth plane, wherein the center of gravity of the handheld cutting tool is located proximate an intersection of the motor housing portion, the drive housing portion, and the handle portion.

14. The handheld cutting tool of claim 13, wherein the handle portion is positioned within the base plane.

15. The handheld cutting tool of claim 13 further comprising:

a guide bar extending from the drive housing portion; and a chain supported on a guide bar and engaged with the sprocket such that rotation of the sprocket moves the chain along the guide bar, the chain including a plurality of linkages configured to support a plurality of cutting elements.

16. The handheld cutting tool of claim 15, wherein the motor housing portion and the drive housing portion are each at least partially positioned within the base plane.

17. The handheld cutting tool of claim 16, wherein the guide bar has a length within the range of five inches and twelve inches, and wherein the chain is a full-house chain that includes one linkage for every one cutting element.

* * * * *